(12) United States Patent
Jaschek et al.

(10) Patent No.: US 7,499,905 B2
(45) Date of Patent: Mar. 3, 2009

(54) METHOD AND APPARATUS FOR ACCESSING INFORMATION BASED ON DISTRIBUTED FILE SYSTEM (DFS) PATHS

(75) Inventors: Boaz Jaschek, Hod Hasharon (IL); Etai Lev-Ran, Sunnyvale, CA (US); Israel Zvi Ben-Shaul, Palo Alto, CA (US); Daniel Kaminsky, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 282 days.

(21) Appl. No.: 11/253,205

(22) Filed: Oct. 17, 2005

(65) Prior Publication Data

US 2007/0088669 A1      Apr. 19, 2007

(51) Int. Cl.
*G06F 7/00* (2006.01)
*G06F 17/30* (2006.01)

(52) U.S. Cl. .......................................... 707/1
(58) Field of Classification Search ............... 707/1–200
See application file for complete search history.

(56) References Cited

U.S. PATENT DOCUMENTS 5,701,462 A * 12/1997 Whitney et al. ............... 707/10
6,006,018 A * 12/1999 Burnett et al. ................ 709/219
2002/0082464 A1 * 6/2002 Japp et al. .................... 600/10

OTHER PUBLICATIONS

Microsoft, "Overview of DFS in Windows 2000," Revision 2.0, Oct. 7, 2004, 3 pages.
Microsoft, "Distributed File System: A Logical View of Physical Storage," Microsoft Windows 2000 Server, White Paper, copyright 1999, 38 pages.
Snia, "Common Internet File System (CIFS) Technical Reference, Revision: 1.0," Storage Networking Industry Association, Release Date Mar. 1, 2002, 150 pages.

* cited by examiner

*Primary Examiner*—Wilson Lee
*Assistant Examiner*—Nicholas E Allen
(74) *Attorney, Agent, or Firm*—Hickman Palermo Truong & Becker LLP

(57) ABSTRACT

A method is disclosed for accessing information based on Distributed File System (DFS) paths and for automatically and transparently modifying the DFS target server set with additional servers that are preferable to a client. A request to resolve a path to a file is sent to a DFS root node. A response is received from the DFS root node. The response includes one or more first DFS referrals. Each of the one or more first DFS referrals identifies a network entity and a directory that is exported by the network entity, where the file is stored in the directory. A second DFS referral is added to the response. The second DFS referral identifies a particular network entity and a particular directory that is exported by the particular network entity. The response is sent to the client.

28 Claims, 3 Drawing Sheets

METHOD AND APPARATUS FOR ACCESSING INFORMATION BASED ON DISTRIBUTED FILE SYSTEM (DFS) PATHS

FIELD OF THE INVENTION

The present invention generally relates to client-server communications. The invention relates more specifically to a method and apparatus for accessing information based on Distributed File System (DFS) paths.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Distributed File System (DFS) is a mechanism in the MICROSOFT WINDOWS® family of operating systems that provides a uniform naming convention and mapping for collections of servers, shares, directories, and files. As referred to herein, a share is a shared directory that is made accessible, or exported, by one entity in a network for other entities in the network. A directory may include zero or more directory entries, which directory entries may be subdirectories or files.

DFS organizes distributed file resources, such as exported shares and directories, into a logical hierarchy that is also referred to as a DFS logical name space. The DFS logical name space provides a mapping between a logical pathname and the physical location that actually stores the file or directory associated with that logical pathname. The same files and directories may be replicated and stored in multiple different and/or separate physical locations. The replicated files and directories are called replicas. The DFS mechanism in itself does not provide for synchronizing the different replicas of the same files and directories. Instead, a separate content synchronization mechanism, such as the File Replication Service (FRS) provided in the MICROSOFT WINDOWS® family of operating systems, must be used to synchronize the contents of the different replicas.

The DFS logical name space is maintained in a DFS root node. A DFS root is a local share that serves as the starting point and host to other shares. Any shared data resource, such as a file or a directory, can be published in the DFS root node as a share listed under the DFS root. The files and directories published in a DFS root node may be hosted by any network entity that is accessible by other network entities over a network. The entries in the DFS root node include, but are not limited to, directories from a local network host, directories exported by any network server or client, and directories accessible through any network client software, such as, for example, a Common Internet File System (CIFS) client and a Server Message Block (SMB) client.

The mapping of file servers in the DFS logical name space may be dynamically changed by the DFS server. For example, the logical path "\\DFSroot\Projects" may be mapped in the DFS logical name space to physical location "\\server1\ProjA". The DFS server managing the DFS logical name space may then transparently change this physical location to "\\server2\ProjB". This technique may be used in products that provide file virtualization that allows dynamic and frequent changes to the physical location of files between file servers, while at the same time keeping the DFS logical paths unchanged.

A particular file or directory published in a DFS root node as a logical share may be associated with one or more target replicas, where each of the replicas is a copy of the particular file or directory and is physically stored in a directory exported by a server. The DFS root node keeps information that associates the logical name of each replica with its corresponding physical location (e.g. a server and a directory). Since the DFS root node maps a logical representation into physical storage, the physical location of files and directories becomes transparent to users and applications.

For example, suppose that a client wishes to access a file that is located in a share or directory on the network. The client sends a request to the DFS root node to resolve the path to the file. The DFS root node analyzes the path requested by the client, and sends back a list of one or more DFS referrals. Each DFS referral in the list specifies the actual server name, share name and/or directory where the actual file or a replica of the file resides. The client then selects one of the servers specified in the DFS referrals, and proceeds to access the file.

The DFS mechanism has several disadvantages. One disadvantage is that DFS itself does not provide for synchronizing the content of replicated files and directories. DFS must rely on additional protocols and services to synchronize the replicas registered in a DFS root node. This may present serious data integrity and data consistency problems when heavily modified local replicas must be synchronized with heavily accessed remote replicas over low bandwidth and/or high latency communication links.

Another disadvantage is that an administrator must manually register each file or directory in the DFS root node. For example, in an organization of even a modest size that has multiple servers and that shares numerous files and directories among its users, the time and costs required for the manual registration these files and directories in a DFS root node may be significant. Further, since a DFS namespace is managed manually, adding and replacing servers as part of ongoing maintenance may result in stale entries in the DFS referral lists, in the new servers not being integrated properly, etc.

In another example, suppose that an organization has multiple geographically dispersed branch locations. Further suppose that the main branch of the organization has multiple master file servers, which store shared files and directories that are registered in one or more DFS root nodes. In order to provide the users at each branch with local access to the shared files and directories, the organization may want to add one or more new file servers in each of its remote branches to store replicas of the shared files and directories. In order to make use of DFS, each replica for each shared file or directory must be manually registered in a DFS root for each of the new file servers in each branch. However, the time and costs required for the manual registration of each replica in each DFS root node grow exponentially with the increase of the number of files, directories, replicas, branches, and file servers, and can quickly reach prohibitive levels. Moreover, in order to provide better sharing of information, an organization may want to introduce a "caching" solution, which provides for caching files at "caching" file servers in each branch. Integrating such caching solution with existing DFS for accelerating access to the file servers may be a key requirement by the organization. However, current approaches to integrating caching solutions with DFS require adding the "caching" file servers to the existing DFS roots manually, thus complicating the already complex task of introducing the caching solution in the first place.

Based on the foregoing, there is a clear need for a technique for providing transparent access to files and directories based on information in DFS root nodes without the need to manually register each and every replica of the files and directories in the DFS root nodes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
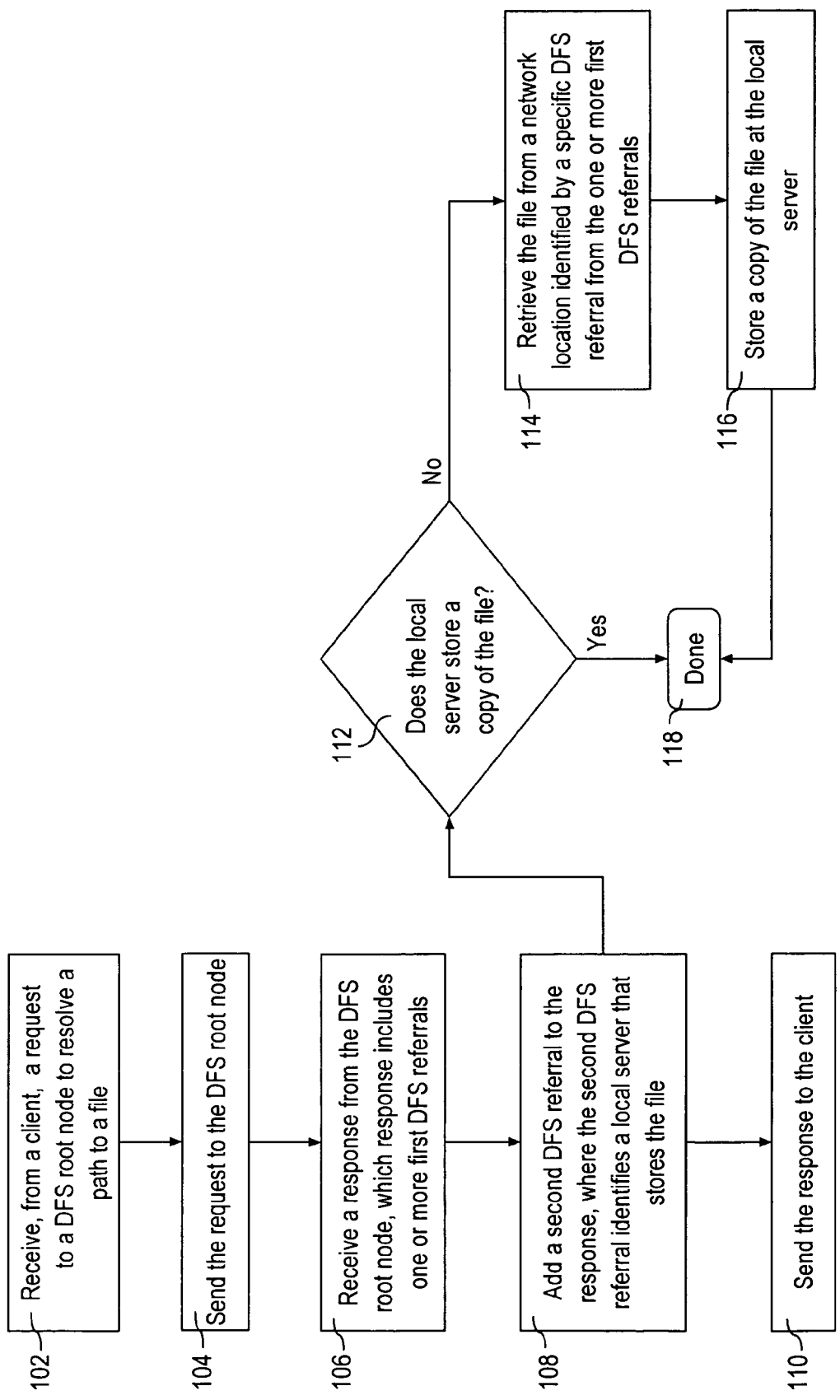
FIG. 1 is a flow diagram that illustrates a high level overview of one embodiment of a method for accessing information based on Distributed File System (DFS) paths.

Techniques for accessing information based on Distributed File System (DFS) paths are described. The techniques provide for integrating DFS paths with caching mechanisms. The integration of DFS paths with caching mechanisms provides for more efficient and coherent access to the resources located on the DFS paths. Further, the techniques described herein provide a coherency advantage over purely replication solutions and a transparency advantage over standalone servers or non-DFS-transparent caches. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Functional Overview
3.0 Method of Accessing Information Based on DFS Paths
   3.1 Structural Overview of an Embodiment
   3.2 DFS Referral List Structure According to an Embodiment
   3.3 Selecting a DFS Referral from the Modified Referral List
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for accessing information based on Distributed File System (DFS) paths. A request to resolve a path to a file is sent to a DFS root node. A response is received from the DFS root node. The response includes one or more first DFS referrals. Each of the one or more first DFS referrals identifies a network entity and a directory that is exported by the network entity, where the file is stored in the directory. A second DFS referral is added to the response. The second DFS referral identifies a particular network entity and a particular directory that is exported by the particular network entity. The response is sent to a client. In a feature of this aspect, the request to resolve the path to the file is received from the client.

In one feature of the aspect, the particular network entity is any one of a server and a workstation. The particular directory comprises one or more directory entries, where the directory entries may be subdirectories or files.

In a feature of this aspect, the file is retrieved from a specific directory exported by a specific network entity. The specific network entity and the specific directory are identified in a specific DFS referral of the one or more first DFS referrals. After retrieval, the file is stored in the particular directory exported by the particular network entity.

In one feature of the aspect, the client locates the file based on the second DFS referral and performs an operation on the file.

In a feature of this aspect, adding the second DFS referral to the response may comprise adding one or more second DFS referrals to the response. In this feature, the second DFS referral is a particular DFS referral of the one or more second DFS referrals. Each of the one or more second DFS referrals corresponds to one of the one or more first DFS referrals and identifies a specific network entity and a specific directory exported by the specific network entity.

In another aspect, a method for accessing information based on DFS paths is described. A particular server receives from a client a request to resolve a path to a file. The request is sent to a DFS root node. The particular server receives a response from the DFS root node. The response includes a referral list that comprises one or more first DFS referrals. Each of the one or more first DFS referrals identifies a server and a directory exported by that server, where the file is stored in the directory. A modified referral list is created by at least adding a second DFS referral to the referral list. The second DFS referral identifies the particular server and a cache of the particular server. The response is sent to the client, where the response includes the modified referral list.

In a feature of this aspect, the particular server receives a command from the client to perform an operation on the file. The client has selected to send the command to the particular server based on the second DFS referral. The particular server then performs the operation on the file. If the file is not stored in the cache, the particular server also performs the steps of: retrieving the file from a specific directory exported by a specific server, where the specific server and the specific directory are identified in a specific DFS referral of the one or more first DFS referrals in the referral list; and storing the file in the cache.

In one feature of the aspect, the client selects the particular server based on the second DFS referral in the modified referral list. The client then attempts to perform an operation on the file at the particular server. In response to the particular server being unavailable, the client attempts to perform the operation on the file at a specific server, where the specific server is identified by a specific DFS referral of the one or more first DFS referrals in the modified referral list.

In a feature of this aspect, the one or more first DFS referrals are ordered in the referral list in a descending order based on the proximity of the client to the servers identified by the one or more first DFS referrals. In this feature, creating the modified referral list may further comprise adding the second DFS referral to the top of the referral list.

In one feature of the aspect, creating the modified referral list may further comprise removing the one or more first DFS referrals from the referral list.

In a feature of this aspect, creating the modified referral list may further comprise adding one or more second DFS referrals to the modified referral list, where the second DFS referral is a particular DFS referral of the one or more second DFS referrals. Each of the one or more second DFS referrals corresponds to one of the one or more first DFS referrals and identifies the particular server and a separate location in the cache of the particular server.

In one feature of the aspect, the request to the DFS root node and the response from the DFS root node conform to a DFS protocol. In this feature, the particular server determines the specific version of the DFS protocol that is supported by the client. Based on this specific version of the DFS protocol, the particular server may perform at least one of the steps of: adding the second DFS referral to the top of the referral list, and removing the one or more first DFS referrals from the referral list.

In a feature of this aspect, the client is communicatively connected to the particular server over a particular Local Area Network (LAN). Each server identified by a DFS referral in the referral list is established in a LAN that is connected to the particular LAN over a communication link. The communication link may be any one of a dial-up connection, a Wide Area Network (WAN) connection, a Digital Subscriber Line (DSL) connection, and an Integrated Services Digital Network (ISDN) connection.

In other aspects, the invention encompasses a computer apparatus and a computer-readable medium configured to carry out the foregoing steps.

Further, the techniques for accessing information based on DFS paths described herein support dynamic changes to DFS root information. When a DFS mapping of a logical path to a physical location is changed at the DFS root either manually (e.g. by a network administrator) or by an external software application (e.g. file virtualization, error recovery, fail over, or redundancy hardware and/or software applications), the techniques described herein handle and propagate the changes to the DFS clients. In some embodiments, such dynamic changes to DFS root entries may be immediately propagated to DFS clients. In other embodiments, the propagation of such changes may be slightly delayed due to updates performed to the clients' DFS caches. The techniques for accessing and manipulating DFS information described herein do not add any further delay or any additional caching because of changes that may be dynamically made to DFS root information; whenever a DFS client requests DFS referrals, the DFS client gets the most up-to-date referral information found in the DFS root.

2.0 Functional Overview

FIG. 1 is a flow diagram that illustrates a high level overview of one embodiment of a method for accessing information based on Distributed File System (DFS) paths. The steps of the method depicted in FIG. 1 may be performed by any device, such as a workstation system or a server system, which is capable of executing stored sequences of instructions.

For illustrative purposes only, the steps of the method are described with respect to an example scenario in which a client, such as a file system driver executing in a computer system, provides access to files for a software application. Suppose that the software application attempts to access the file "contacts.xml", which is located in "\\ServerL\MyContacts\Corporate\Sh_Docs\", where "\\ServerL\" is the path to a local file server that is on the same LAN as the client. The directory "\\ServerL\MyContacts\Corporate\" is located in the file system of the local file server and includes the sub-directory "\Sh_Docs\", which is a logical share that is registered in a DFS root node. The DFS root node maps the share "\Sh_Docs\" to a physical location at "\\ServerA\Docs\", where the original directory is stored, and to a physical location at "\\ServerB\Docs\", where a replica of the original directory is stored.

In step 102, a request to a DFS root node to resolve a path to a file is received from a client. With respect to the example scenario described above, the client determines the path to directory "\\ServerL\MyContacts\Corporate\" because the directory is located on the local file server, but is unable to resolve the path to sub-directory "\Sh_Docs\" because this directory is physically located in another computer system. Hence, the client sends a request to the DFS root node to resolve the path to directory "\Sh_Docs\".

In step 104 the request is sent to the DFS root node. In step 106, a response is received from the DFS root node. The response includes one or more first DFS referrals that identify a network location (e.g. a network entity and a directory exported by that network entity) where the file is stored. With respect to the example scenario, the response from the DFS root node would include two network locations for directory "\Sh_Docs\": "\\ServerA\Docs\" and "\\ServerB\Docs\".

In step 108, a second DFS referral is added to the response from the DFS root node. The second DFS referral identifies a local cache server that stores a copy of the file. In one embodiment, a local file server essentially adds a DFS referral to itself to the one or more first DFS referrals in the response from the DFS root node. For example, in the example scenario described above, the second DFS referral may identify the network location "\\ServerL\Cache\", where the directory "\Cache\" is a shared directory stored in the file system of the local file server "ServerL". In other embodiments, a local file server may add one or more second DFS referrals to the response, where the one or more second DFS referrals identify network locations that are proximate to the client that requested the file.

In some embodiments, the local file server may add to the response from the DFS root node a separate second DFS referral for each DFS referral that is originally present in the response. Each separate second DFS referral identifies a separate location in the local file server, where each separate location stores a copy of the file that is retrieved from a network location identified by one of the DFS referrals originally present in the response from the DFS root node. For example, in the example scenario described above, the local file server may add two second DFS referrals to the response from the DFS root to identify the network locations "\\ServerL\Cache\ServerA\Docs\" and "\\ServerL\Cache\ServerB\Docs\". The directory "\Cache\ServerA\Docs\" is a shared directory on the local file server "ServerL" that is designated for storing content from the directory "\\ServerA\Docs\", and the directory "\Cache\ServerB\Docs\" is a shared directory on the local file server "ServerL" that is designated for storing content from the directory "\\ServerB\Docs\".

In some embodiments, the network location where the file is stored may be any physical storage where a local file server may store the file. For example, the local file server may store the file in a cache in volatile memory. In this example, the local file server may service any subsequent requests for the file from the volatile memory. In another example, the local file server may store the file in a cache in non-volatile persistent storage, such as a file system on a hard disk. In yet another example, the local file server may store the file in a database. The techniques described herein may be implemented regardless of the particular location where a file may be stored, and for this reason the examples of storage locations provided herein are not restrictive.

After step 108 is completed, steps 110 and 112 are performed. In some embodiments, steps 110 and 112 may be performed concurrently or in close succession. In other embodiments, step 110 may be performed first, and step 112 may be performed in response to a subsequent request for the file that is sent to the local server.

In step 110 the response from the DFS root that includes the second DFS referral is sent to the client. In step 112, a determination is made whether the local server stores a copy of the file. If the local server stores a copy of the file, then processing is completed as indicated in block 118. In the example scenario, if in step 112 it is determined that the network location at "\\ServerL\Cache\" already stores a copy of the file "contacts.xml", then processing is complete.

If the local server does not store a copy of the requested file, in step 114 the file is retrieved from a network location identified by a specific DFS referral that is received in the original response from the DFS root node. In step 116, the file is stored at the local server and processing is completed in block 118. Either or both of steps 114 and 116 may be performed by any content synchronization mechanism that is available to the local server. With respect to the example scenario, the local file server "ServerL" retrieves file "contacts.xml" from the network location at "\\ServerB\Docs\" and stores the file in its local file system at "\\ServerL\Cache\contacts.xml".

If in a particular embodiment a separate DFS referral is added to the response from the DFS root node for each DFS referral originally present in the response, then in this embodiment steps 114 and 116 are performed for each original DFS referral. This means that separate copies of the file are retrieved and stored in separate locations at the local file server. For example, if a copy of the "contacts.xml" file is stored in both network locations "\\ServerA\Docs\" and "\\ServerB\Docs\", then the local file server may correspondingly retrieve and store two copies of the file, for example, at the local shared directories "\\ServerL\Cache\ServerA\Docs\contacts.xml" and "\\ServerL\Cache\ServerB\Docs\contacts.xml".

Upon receiving the response from the DFS root node, the client can decide at which network location to access the file based on the DFS referrals included in the response. The client may decide to access the file at the network location specified by the added second DFS referral, or the client may decide to access the file at one of the locations registered at the DFS root node. With respect to the example scenario, this would mean that the client may choose to access the file at the local server at "\\ServerL\Cache\contacts.xml", or the client may choose to access the file at any of the locations registered in the DFS root node, for example, at "\\ServerA\Docs\contacts.xml" or "\\ServerB\Docs\contacts.xml".

Figure 2:
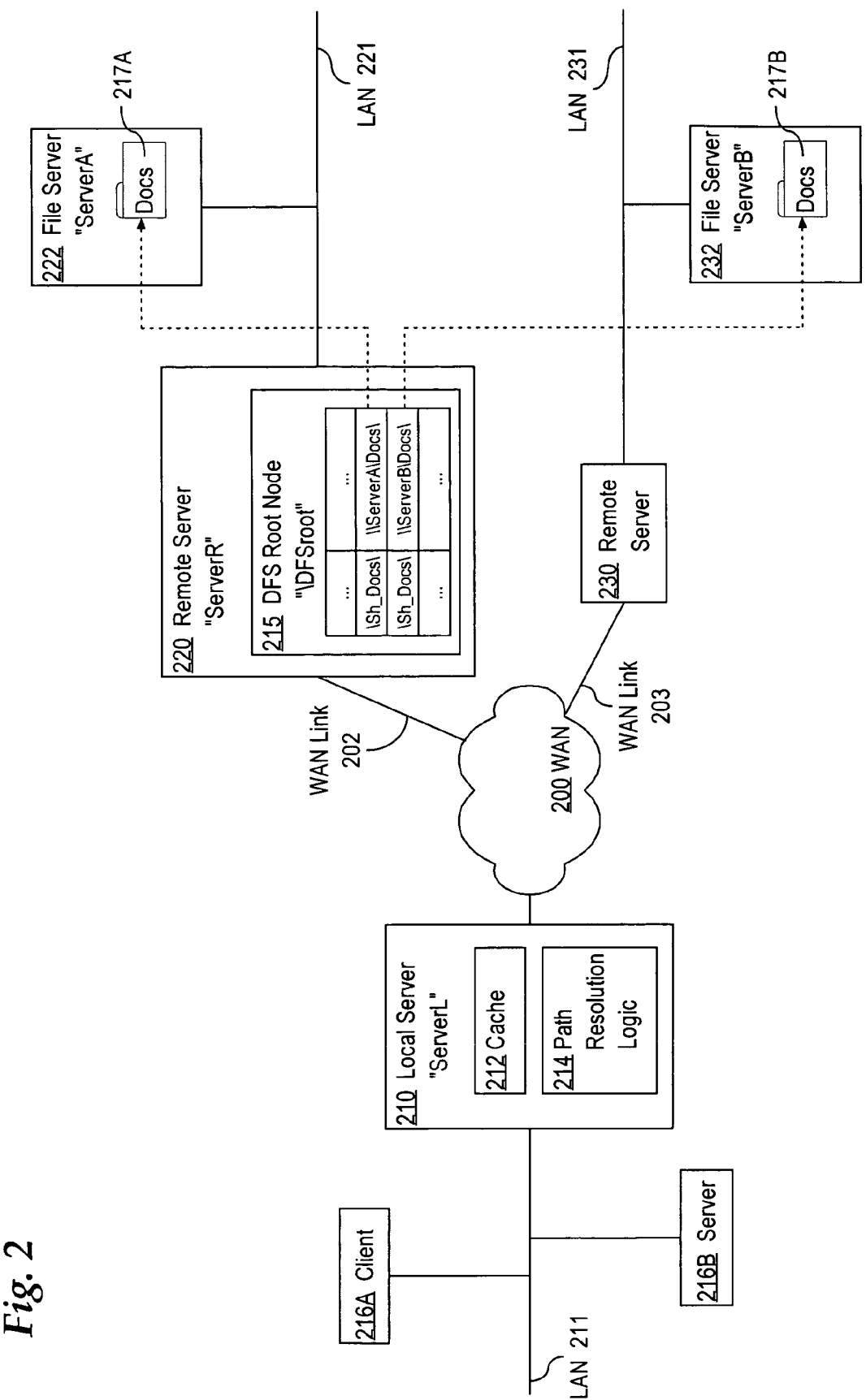
FIG. 2 is a block diagram that illustrates a high level overview of a system in which an embodiment may be implemented.

3.0 Method of Accessing Information Based on DFS Paths 3.1 Structural Overview of an Embodiment FIG. 2 is a block diagram that illustrates a high level overview of a system in which one embodiment may be implemented. For content synchronization, the system may utilize the file-sharing and file-caching techniques described U.S. patent application Ser. No. 10/485,178, entitled "VIRTUAL FILE-SHARING NETWORK," filed by Etai Lev Ran et al. on Jan. 29, 2004, the entire contents of which are herein incorporated by reference for all purposes as if originally set forth herein, and which is referred to hereinafter as the "VFN" patent application.

In this embodiment, one or more network entities, such as client 216A and server 216B, are communicatively connected over a Local Area Network (LAN) 211 to local server 210. The one or more entities may be any type of computing or communication devices, such as, for example, workstations, servers, printers, and mobile devices. The one or more network entities may execute various clients or drivers that are capable of sending requests and receiving responses over LAN 211.

Local server 210 has a network name of "ServerL" and comprises cache 212 and path resolution logic 214. Cache 212 is a storage area in volatile and/or non-volatile storage that may be used by local server 210 to store various information including, but not limited to, any information received from remote servers and any data content, such as individual files or entire directories of files. Path resolution logic 214 resolves DFS paths according to the techniques described herein, and may comprise one or more modules depending on the particular implementation.

Local server 210 acts a proxy that provides access to one or more remote LANs, such as LANs 221 and 231, through Wide Area Network (WAN) 200 for the network entities established in LAN 211. Local server 210 is communicatively connected, over WAN 200, to one or more remote proxy servers in each remote LAN. For example, in FIG. 2, local server 210 is depicted as connected to remote servers 220 and 230 over WAN links 202 and 203, respectively. Remote server 220 is communicatively connected to one or more network entities, such as file server 222, over LAN 221. Similarly, remote server 230 is communicatively connected to one or more network entities, such as file server 232, over LAN 231.

Remote servers 220 and 230 act as proxies that provide access over WAN 200 to one or more LANs, such as LAN 211, for network entities established in their respective LANs. The proxy servers intercept all traffic that is exchanged over WAN 200 between entities of different LANs. The proxy servers may employ a variety of caching and traffic-reducing techniques to reduce or eliminate the negative effects of the low bandwidth and the high latency of the WAN links. This type of network infrastructure is suitable for use by an organization that may have a plurality of geographically dispersed branches. For example, LAN 211 may be established in a local branch of the organization, and LANs 221 and 231 may be established at remote branches of the organization.

In FIG. 2, file server 222 has a network name of "ServerA". File server 222 stores a directory 217A and exports this directory as a share. Directory 217A is named "Docs" and may store zero or more files and zero or mode sub-directories. File server 232 has a network name of "ServerB" and stores a replica 217B of directory 217A. The replica 217B is also named "Docs" and stores copies of the files and/or sub-directories that are stored in directory 217A.

Remote server 220 has a network name of "ServerR" and provides support for a DFS via DFS root node 215. DFS root node 215 maintains a DFS logical name space in a logical share with a UNC path of "\\ServerR\DFSroot\". In different embodiments, the DFS root node may be implemented in a wide variety of ways including, but not limited to, as a stand-alone process, as a service, as a driver, and as any combination of client and/or server processes that are capable of receiving and responding to requests for information. Further, in different embodiments DFS root node 215 may be executing on any server or workstation in any LAN, such as, for example, on file servers 222 and 232, on local server 210, or on any server in any network, such as server 216B. Thus, the depiction of DFS root node 215 as part of remote server 220 in FIG. 2 is only one example of where a DFS root node may be located.

DFS root node 215 keeps information that associates the logical name of each registered share with the path to its corresponding physical location, such as, for example, the path to a server name and a share name. As depicted in FIG. 2, among other registered shares, DFS root node 215 associates the logical share located at "\\ServerR\DFSroot\Sh_Docs\" with both the path to the original directory 117A ("\\ServerA\Docs\") and the path to its replica 117B ("\\ServerB\Docs\"). The shares registered in DFS root node 215 may be any shared files or directories that are exported, or made accessible to other network entities, by any network entity that is capable of sharing portions of its file system, such as, for example, servers, workstations, and mobile devices.

Referring to the system depicted in FIG. 2, in one example implementation of the techniques described herein, file server 222 stores in directory 217A a file named "contacts.xml". The replica 217B on file server 232 also stores a copy of that file.

In operation, an application executing on client 216A requests to access file "contacts.xml" which is listed in the local file system at "\\DFSRoot\Contacts\Corporate\Sh_Docs\contacts.xml". Directory "\Sh_Docs\" is a logical share that is registered in DFS root node 215.

Client 216A receives the request to access file "contacts.xml" at "\\DFSroot\Contacts\Corporate\Sh_Docs\contacts.xml" from the application. Since directory "\Sh_Docs\" does not reside locally, the client 216A asks for a referral to the physical location of that directory by sending a "TRANS2_DFS_GET_REFERRAL" request to DFS root node 215. The "TRANS2_DFS_GET_REFERRAL" request includes the path to the DFS root at "\\ServerR\DFSroot\". The path resolution logic 214 at local server 210 intercepts the "TRANS2_DFS_GET_REFERRAL" request and resends it to DFS root 215.

Once path resolution logic 214 receives the response from DFS root node 215, it adds to the response the local server 210 as a location that stores the file. Specifically, the response from DFS root node 215 includes a list of DFS referrals that identify a network location where the "\Sh_Docs\" directory is physically stored. For example, for the "\ShDocs\" directory the list of DFS referrals includes two entries, "\\ServerA\Docs\" and "\\ServerB\Docs\", which point to the original and the replicated "Docs" directory, respectively. Path resolution logic 214 then adds the entry "\\ServerL\Cache\" to the top of this list of DFS referrals, where the entry "\\ServerL\Cache\" identifies cache 212 as the storage location where the file "contacts.xml" is stored. Path resolution logic 214 then sends the modified DFS referral list to client 216A.

In some embodiments, path resolution logic 214 may add to the response from DFS root node 215 a separate location at local server 210 for each DFS referral in the response. For example, the DFS referral list may include two entries, "\\ServerA\Docs\" and "\\ServerB\Docs\", which point to the original and the replicated "Docs" directory, respectively. In these embodiments path resolution logic 214 may add two separate entries to the DFS referral list, "\\Server\Cache\ServerA\Docs\" and "\\Server\Cache\ServerA\Docs\", which point to two separate locations in cache 212 as storage locations where the file "contacts.xml" may be stored.

In addition, local server 210 sends a content synchronization request to retrieve the contents of file "contacts.xml". For example, if path resolution logic 214 determines that remote server 232 is the nearest network location that has the file, local server 210 then sends a request to remote server 232 to retrieve the file. In one embodiment, the request is sent over the content synchronization mechanisms described in the VFN patent application. In this embodiment, if file "contacts.xml" is already stored in the local cache, no further synchronization will be required. In other embodiments, local server 210 may use any available content synchronization mechanism, such as, for example, the File Replication Service (FRS) provided in the MICROSOFT WINDOWS® family of operating systems. Local server 210 receives the contents of the "contacts.xml" file and stores the file in cache 212.

Client 216A receives the modified DFS referral list, and determines based on the added DFS referral that local server 210 ("\\ServerL\") is the nearest network location that stores the file. Client 216A then mounts the share from "\\ServerL\Cache\" and proceeds to access the file "contacts.xml" as requested by the application.

If client 216A sends a request asking for site information or the location of the newly added server to the DFS referral list, path resolution logic 214 intercepts the request and responds by informing client 216A that local server 210 is on the same network as client 216A. Any subsequent requests from client 216A for file "contacts.xml", such as, for example, a CIFS open file command that immediately follows the request for DFS referrals, are intercepted by local server 210 and redirected to the copy of the file in cache 212 of local server 210.

Embodiments of the techniques described herein may be implemented in operational contexts and/or in systems that are different than the operational context and the system depicted in FIG. 2. For example, in one embodiment, a client may perform the steps performed by the local server as described above. In this embodiment, the client may be connected to a remote server that hosts the DFS root node over a dial-up connection, a Digital Subscriber Line (DSL) connection, an Integrated Services Digital Network (ISDN) connection, or any other type of slow or low-bandwidth communication link. In another example, in some embodiments a hierarchy or forest of DFS roots may be created in different locations at different remotes sites. In these embodiments, requests for DFS paths to all DFS roots in the forest or hierarchy may be intercepted and handled by path resolution logic 214 of local server 210. The DFS root nodes in the hierarchy or forest may be either standalone DFS root servers each hosting a DFS database locally, or they may share a DFS database in a domain-based DFS configuration.

Moreover, the remote server itself may manage the files or directories that are requested by the client. Furthermore, embodiments may include any number of clients, servers, or DFS roots. For example, the remote server may host a global DFS root, while the local server may host a local DFS root. In addition, a wide variety of content synchronization mechanisms may be used to create replicas of shared files or directories in the cache of the local server. Thus, the techniques and approaches described herein are not limited to any particular operational context or system, and the operational context and the system depicted in FIG. 2 are to be regarded in an illustrative rather than a restrictive sense.

3.2 DFS Referral List Structure

In some embodiments, a DFS may conform to the specification described in "Common Internet File System (CIFS), Technical Reference, Revision 1.0", published by the Storage Networking Industry Association (SNIA) on Mar. 1, 2002, the entire contents of which are herein incorporated by reference for all purposes as if originally set forth herein. For the purposes of illustrating the techniques described herein, embodiments are described below with respect to a DFS that conforms to this specification.

In one embodiment, a DFS root node keeps the mapping between logical shares and their physical locations in a Partition Knowledge Table (PKT). A portion of the PKT table for the logical share "\Sh_Docs\" (as depicted in FIG. 2) is shown in Table 1 below.

TABLE 1

Partition Knowledge Table

| DFS Path | Physical Location | Time to Live |
|---|---|---|
| ... | ... | ... |
| \\ServerR\DFSroot\Sh_Docs\ | \\ServerA\Docs\; \\ServerB\Docs\ | 300 |
| ... | ... | ... |

In Table 1, the "DFS Path" field for a particular PKT entry stores the path to the logical share relative to the DFS root (e.g. "\\ServerR\DFSroot\Sh_Docs\"). The "Physical Location" field stores one or more physical locations where the original or the replicas of the logical share are stored. For each entry in the PKT, the "Physical Location" field stores a list of one or more server/share combinations that identify the network location where the data pointed to by the logical share is stored (e.g. \\ServerA\Docs\; \\ServerB\Docs\). The "Time to Live" field stores values indicating the number of seconds for which the client can cache the particular PKT entry (e.g. 300 seconds). Upon expiration of the time-to-live, the client may remove the PKT entry.

The entries in the PKT are used by a DFS root node to respond to a "TRANS2_GET_DFS_REFERRAL" request for DFS referrals for the path to a particular file. Some of the fields in the response are listed in Table 2.

TABLE 2

DFS Root Node Response Fields

| Field | Description |
|---|---|
| Number Of Referrals | Number of DFS referrals included in the response |
| Flags | Bit 0: when set, indicates that the servers listed in the Referral List are capable of fielding TRANS2_GET_DFS_REFERRALS requests<br>Bit 1: when set indicates the servers listed in the Referral List hold the storage for the requested file |
| Referral List | The set of DFS referrals for the requested file |

The "Referral List" field in the DFS response includes one or more DFS referrals that identify a network entity and a share exported by that entity in which the requested file is stored. In this embodiment, depending on the version of the DFS protocol that is used by the client to request DFS referrals from a DFS root node, there may be two versions of the DFS referral structure. Some of the fields included in each version of DFS referrals structure are listed in tables 3A and 3B.

TABLE 3A

DFS Referral Structure - Version 1

| Field | Description |
|---|---|
| Version Number | Version of the DFS referral |
| Referral Size | Size of the DFS referral |
| Server Type | Type of node handling the DFS referral (SMB server, Netware Server, Domain Server, etc.) |
| Referral Flags | Flags describing the DFS referral |

TABLE 3A-continued

DFS Referral Structure - Version 1

| Field | Description |
|---|---|
| File Name | The physical location of the share (e.g. \\ServerA\Docs\) |

TABLE 3B

DFS Referral Structure - Version 2

| Field | Description |
|---|---|
| Version Number | Version of the DFS referral |
| Referral Size | Size of the DFS referral |
| Server Type | Type of node handling the DFS referral (SMB server, Netware Server, Domain Sever, etc.) |
| Referral Flags | Flags describing the DFS referral |
| Proximity | Describes the proximity of the server identified in the DFS referral to the client |
| Time To Live | Number of seconds for which the client can cache this DFS referral |
| File Name | The physical location of the share (e.g. \\ServerA\Docs\) |
| 8.3 File Name | The physical location of the share in 8.3 filename format |

In this embodiment, according to the techniques described herein, a response with a list of DFS referrals is received. A DFS referral is created in a data structure that corresponds to one of the versions described above. The created DFS referral identifies the local server and a cache on the local server where a copy of the file is stored. This DFS referral is then added to the DFS referral list before the response from the DFS root node is sent to the client.

3.3 Selecting a DFS Referral from the Modified Referral List

Upon receiving a modified DFS referral list, which includes a DFS referral to a local server, the client may select a DFS referral and may access the requested file at the server identified by the selected DFS referral. The client may select the DFS referral from the referral list based on the client type and/or on the version of the DFS protocol utilized by the client to request information from the DFS root node.

For example, some embodiments provide support for clients such as MICROSOFT WINDOWS 95®, MICROSOFT WINDOWS 98®, and MICROSOFT WINDOWS NT®, which use a particular version of a DFS protocol to communicate with a DFS root node. In this version of the DFS protocol, the DFS referrals are ordered in the referral list according to the order in which the DFS referrals appear in the PKT of the DFS root node. Upon receiving a response from the DFS root node that includes a DFS referral list, these clients randomly select a DFS referral from the referral list. According to the techniques described herein, in order to support these types of clients, all DFS referrals are removed from the referral list in the response received from the DFS root node. A DFS referral identifying a local server and a share or cache on the local server is added as the only DFS referral in the referral list. This modified referral list, which has only one entry, is then sent to the client. In this way, the client is prevented from attempting to access the requested file at a remote server. The only option for the client is to access the file at the local server identified by the only DFS referral in the referral list.

In another example, some embodiments provide support for clients such as MICROSOFT WINDOWS 2000® and MICROSOFT WINDOWS XP®, which use a different version of a DFS protocol to communicate with a DFS root node. In this version of the DFS protocol, before sending a response to the client, the DFS root node sorts the DFS referrals in the referral list in a descending order according to the proximity of the client to each of the servers identified by the DFS referrals. The DFS referrals identifying servers nearest the client are placed near the top of the referral list, and the DFS referrals identifying servers farther away from the client are placed near the bottom of the referral list. According to the techniques described herein, in order to support these types of clients, the DFS referral identifying a local server and a share or cache on the local server that stores the requested file is added to the top of the referral list received in the response from the DFS root node. This modified referral list, in which the DFS referral identifying the local server is at the top of the list, is then sent to the client. Upon receiving the modified referral list, the client attempts to access the requested file at the server identified by the DFS referral at the top of the list, which is the local server. In this way, the client is prevented from attempting to access the requested file at a remote server and achieves a much better performance by using the cache at the local file server.

In these embodiments, after receiving the modified referral list the client may also cache each DFS referral in the list for a certain period of time. Within this period of time, the client may select to access the file at the local server based on the DFS referral that is at the top of the modified referral list, which DFS referral identifies the local server. The client may then attempt to perform an operation on the file at the local server. However, the local server may have become unavailable between the time the response with the modified referral list was sent to the client and the time the client attempts to perform the operation. According to the techniques described herein, upon detecting that the local server is unavailable, the client may select another DFS referral that is stored in the cache, and may attempt to perform the same operation on the file at the server identified by that DFS referral. In this way, the techniques described herein provide for preventing the client from accessing the requested file at a remote server, while at the same time providing a fail-over mechanism for accessing the file at the remote server when the local server is unavailable for whatever reason.

4.0 Implementation Mechanisms—Hardware Overview

Figure 3:
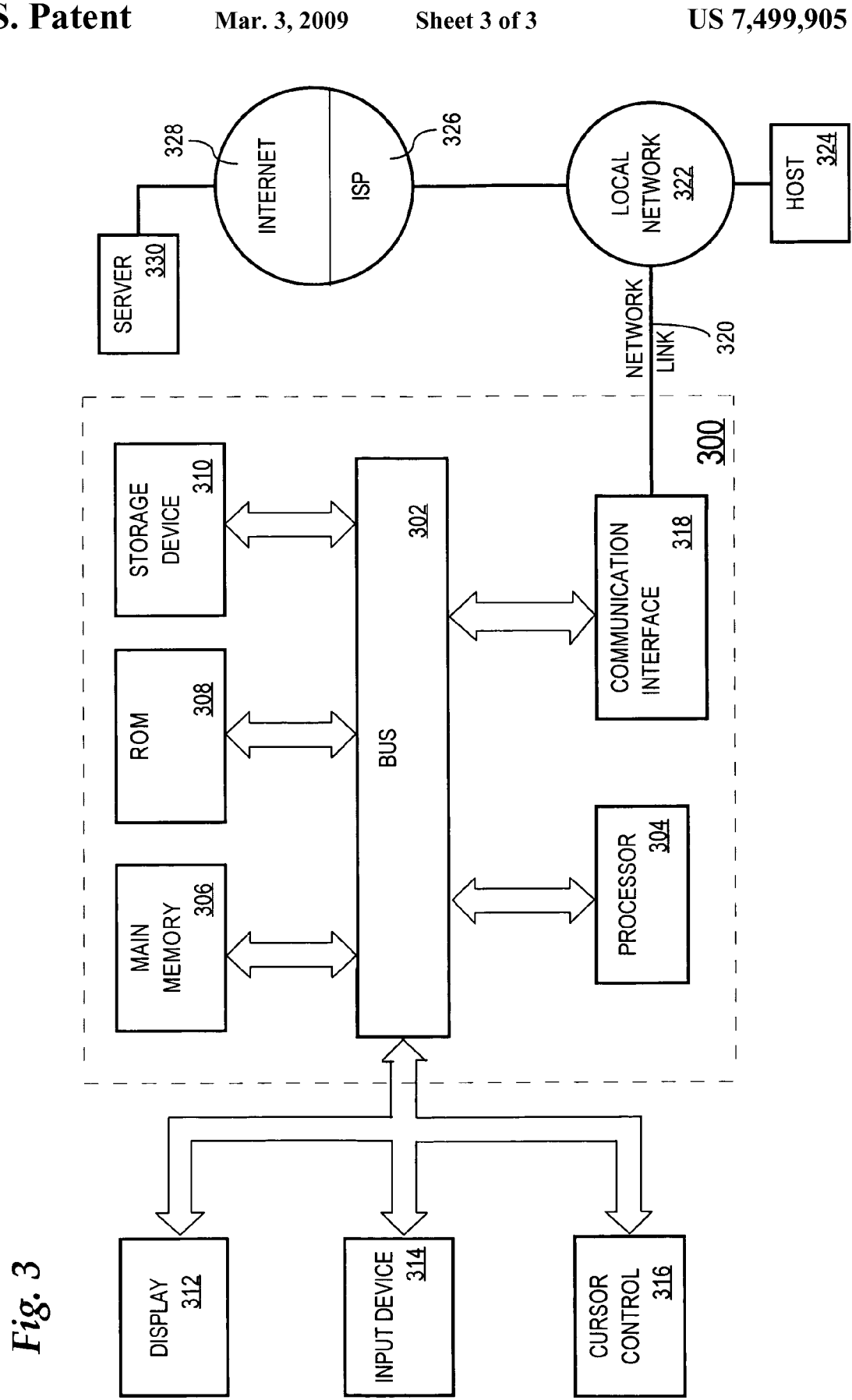
FIG. 3 is a block diagram that illustrates a computer system upon which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory ("RAM") or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory ("ROM") 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube ("CRT"), for displaying information to a computer user. An input device 314, including alphanumeric and other keys, is coupled to bus 302 for communicating information and command selections to processor 304. Another type of user input device is cursor control 316, such as a mouse, trackball, stylus, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for accessing information based on Distributed File System (DFS) paths. According to one embodiment of the invention, accessing information based on DFS paths is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network ("ISDN") card or a modem to provide a data communication connection to a corresponding type of telephone line. As another example, communication interface 318 may be a local area network ("LAN") card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider ("ISP") 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for accessing information based on DFS paths as described herein.

The received code may be executed by processor 304 as it is received, and/or stored in storage device 310, or other non-volatile storage for later execution. In this manner, computer system 300 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of accessing information based on Distributed File System (DFS) paths, the method comprising the computer-implemented steps of:
   a server intercepting a request to resolve a path to a file, wherein the request is sent from a client to a DFS root node;
   wherein the DFS root node maintains a logical name space that includes a mapping between logical paths of network shares and physical location paths identifying network locations where the network shares are physically stored;
   wherein, based on the mapping, the DFS root node is operable to resolve the logical paths of the network shares to the physical location paths;
   the server sending, to the DFS root node, the request to resolve the path to the file;
   the server receiving a response from the DFS root node, wherein the response includes one or more first DFS referrals, wherein each of the one or more first DFS referrals identifies a network entity and a directory exported by the network entity, wherein the file is stored in the directory;
   in response to receiving the response from the DFS root node, the server adding a second DFS referral to the response, wherein the second DFS referral identifies a particular network entity and a particular directory exported by the particular network entity;
   wherein each of the second DFS referral and the one or more first DFS referrals is a data structure that includes data identifying a physical location path to a separate copy of the same directory; and
   the server sending the response to the client;
   wherein the response sent to the client includes the one or more first DFS referrals and the second DFS referral.

2. A method as recited in claim 1, wherein:
   the particular network entity is any one of a server and a workstation; and
   the particular directory comprises one or more directory entries.

3. A method as recited in claim 1, further comprising:
   retrieving the file from a specific directory exported by a specific network entity, wherein the specific network entity and the specific directory are identified in a specific DFS referral of the one or more first DFS referrals; and
   caching the file in the particular directory exported by the particular network entity.

4. A method as recited in claim 3, further comprising the client performing the steps of:
   locating the file based on the second DFS referral; and
   performing an operation on the file.

5. A method as recited in claim 1, wherein adding the second DFS referral to the response comprises adding one or more second DFS referrals to the response, wherein:
   the second DFS referral is a particular DFS referral of the one or more second DFS referrals;
   each of the one or more second DFS referrals corresponds to one of the one or more first DFS referrals; and
   each of the one or more second DFS referrals identifies a specific network entity and a specific directory exported by the specific network entity.

6. A method of accessing information based on Distributed File System (DFS) paths, the method comprising the computer-implemented steps of:
   at a particular server, intercepting a request to resolve a path to a file, wherein the request is sent from a client to a DFS root node;
   wherein the DFS root node maintains a logical name space that includes a mapping between logical paths of network shares and physical location paths identifying network locations where the network shares are physically stored;
   wherein, based on the mapping, the DFS root node is operable to resolve the logical paths of the network shares to the physical location paths;
   the particular server sending the request to the DFS root node;
   the particular server receiving a response from the DFS root node, wherein the response includes a referral list that comprises one or more first DFS referrals, wherein each of the one or more first DFS referrals identifies a server and a directory exported by the server, wherein the file is stored in the directory;
   in response to receiving the response from the DFS root node, the particular server creating a modified referral list by at least adding a second DFS referral to the referral list, wherein the second DFS referral identifies the particular server and a cache of the particular server;

wherein, in the modified referral list, each of the second DFS referral and the one or more first DFS referrals is a data structure that includes data identifying a physical location path to a separate copy of the same directory; and the particular server sending the response to the client, wherein the response includes the modified referral list, wherein the modified referral list includes the one or more first DFS referrals and the second DFS referral.

7. A method as recited in claim 6, further comprising:
at the particular server, receiving a command from the client to perform an operation on the file, wherein the client has selected to send the command to the particular server based on the second DFS referral;
performing the operation on the file, wherein if the file is not stored in the cache, then performing the operation further comprises:
retrieving the file from a specific directory exported by a specific server, wherein the specific server and the specific directory are identified in a specific DFS referral of the one or more first DFS referrals; and
storing the file in the cache.

8. A method as recited in claim 6, further comprising the client performing the steps of:
selecting the particular server based on the second DFS referral in the modified referral list;
attempting to perform an operation on the file at the particular server; and
in response to unavailability of the particular server, attempting to perform the operation on the file at a specific server, wherein the specific server is identified by a specific DFS referral of the one or more first DFS referrals in the modified referral list.

9. A method as recited in claim 6, wherein:
the one or more first DFS referrals are ordered in the referral list in a descending order based on the proximity of the client to the servers identified by the one or more first DFS referrals; and
creating the modified referral list further comprises adding the second DFS referral to the top of the referral list.

10. A method as recited in claim 6, wherein creating the modified referral list further comprises removing the one or more first DFS referrals from the referral list.

11. A method as recited in claim 6, wherein creating the modified referral list further comprises adding one or more second DFS referrals to the modified referral list, wherein:
the second DFS referral is a particular DFS referral of the one or more second DFS referrals;
each of the one or more second DFS referrals corresponds to one of the one or more first DFS referrals; and
each of the one or more second DFS referrals identifies the particular server and a separate location in the cache of the particular server.

12. A method as recited in claim 6, wherein:
the request to the DFS root node and the response from the DFS root node conform to a DFS protocol; and
the method further comprises the steps of:
determining a specific version of the DFS protocol that is supported by the client; and
creating the modified referral list further comprises performing, based on the specific version of the DFS protocol, at least one of the steps of:
adding the second DFS referral to the top of the referral list; and
removing the one or more first DFS referrals from the referral list.

13. A method as recited in claim 6, wherein:
the step of, at the particular server, intercepting the request to resolve the path to the file further comprises the step of receiving the request from the client that is communicatively connected to the particular server over a particular Local Area Network (LAN); and
each server identified by a DFS referral in the referral list is established in a LAN that is connected to the particular LAN over a communication link.

14. A method as recited in claim 13, wherein the step of receiving the response from the DFS node further comprises receiving the response over the communication link that is any one of a dial-up connection, a Wide Area Network (WAN) connection, a Digital Subscriber Line (DSL) connection, and an Integrated Services Digital Network (ISDN) connection.

15. An apparatus for accessing information based on Distributed File System (DFS) paths, comprising:
one or more processors for executing,
a means for intercepting a request to resolve a path to a file, wherein the request is sent from a client to a DFS root node;
wherein the DFS root node maintains a logical name space that includes a mapping between logical paths of network shares and physical location paths identifying network locations where the network shares are physically stored;
wherein, based on the mapping, the DFS root node is operable to resolve the logical paths of the network shares to the physical location paths;
a means for sending, to the DFS root node, the request to resolve the path to the file; means for receiving a response from the DFS root node, wherein the response includes one or more first DFS referrals, wherein each of the one or more first DFS referrals identifies a network entity and a directory exported by the network entity, wherein the file is stored in the directory;
a means for adding, in response to receiving the response from the DFS root node, a second DFS referral to the response, wherein the second DFS referral identifies a particular network entity and a particular directory exported by the particular network entity;
wherein each of the second DFS referral and the one or more first DFS referrals is a data structure that includes data identifying a physical location path to a separate copy of the same directory; and
means for sending the response to the client;
wherein the response sent to the client includes the one or more first DFS referrals and the second DFS referral.

16. The apparatus of claim 15, wherein:
the particular network entity is any one of a server and a workstation; and
the particular directory comprises one or more directory entries.

17. The apparatus of claim 15, further comprising:
means for retrieving the file from a specific directory exported by a specific network entity, wherein the specific network entity and the specific directory are identified in a specific DFS referral of the one or more first DFS referrals; and
means for storing the file in the particular directory exported by the particular network entity.

18. The apparatus of claim 17, wherein, after receiving the response, the client locates the file based on the second DFS referral and performs an operation on the file.

19. An apparatus for accessing information based on Distributed File System (DFS) paths, comprising:
one or more processors; and
one or more stored sequences of instructions which, when executed by the one or more processors, cause the one or more processors to perform the steps of:
intercepting a request to resolve a path to a file, wherein the request is sent from a client to a DFS root node;
wherein the DFS root node maintains a logical name space that includes a mapping between logical paths of network shares and physical location paths identifying network locations where the network shares are physically stored;
wherein, based on the mapping, the DFS root node is operable to resolve the logical paths of the network shares to the physical location paths;
sending the request to the DFS root node;
receiving a response from the DFS root node, wherein the response includes a referral list that comprises one or more first DFS referrals, wherein each of the one or more first DFS referrals identifies a server and a directory exported by the server, wherein the file is stored in the directory;
in response to receiving the response from the DFS root node, creating a modified referral list by at least adding a second DFS referral to the referral list, wherein the second DFS referral identifies the apparatus and a cache of the apparatus;
wherein, in the modified referral list, each of the second DFS referral and the one or more first DFS referrals is a data structure that includes data identifying a physical location path to a separate copy of the same directory; and
sending the response to the client, wherein the response includes the modified referral list, wherein the modified referral list includes the one or more first DFS referrals and the second DFS referral.

20. The apparatus of claim 19, wherein the one or more stored sequences of instructions further comprise instructions which, when executed by the one or more processors, cause the apparatus to perform the steps of:
receiving a command from the client to perform an operation on the file, wherein the client has selected to send the command to the apparatus based on the second DFS referral;
performing the operation on the file, wherein if the file is not stored in the cache, then performing the operation further comprises:
retrieving the file from a specific directory exported by a specific server, wherein the specific server and the specific directory are identified in a specific DFS referral of the one or more first DFS referrals; and
storing the file in the cache.

21. The apparatus of claim 19, wherein:
the client selects the apparatus based on the second DFS referral in the modified referral list;
the client attempts to perform an operation on the file at the apparatus; and
in response to unavailability of the apparatus, the client attempts to perform the operation on the file at a specific server, wherein the specific server is identified by a specific DFS referral of the one or more first DFS referrals in the modified referral list.

22. The apparatus of claim 19, wherein:
the one or more first DFS referrals are ordered in the referral list in a descending order based on the proximity of the client to the servers identified by the one or more first DFS referrals; and
creating the modified referral list further comprises adding the second DFS referral to the top of the referral list.

23. The apparatus of claim 19, wherein creating the modified referral list further comprises removing the one or more first DFS referrals from the referral list.

24. The apparatus of claim 19, wherein:
the request to the DFS root node and the response from the DFS root node conform to a DFS protocol; and
the one or more stored sequences of instructions further comprise instructions which, when executed by the one or more processors, cause the one or more processors to perform the steps of:
determining a specific version of the DFS protocol that is supported by the client; and
creating the modified referral list further comprises performing, based on the specific version of the DFS protocol, at least one of the steps of:
adding the second DFS referral to the top of the referral list; and
removing the one or more first DFS referrals from the referral list.

25. The apparatus of claim 19, wherein:
the client is communicatively connected to the apparatus over a particular Local Area Network (LAN); and
each server identified by a DFS referral in the referral list is established in a LAN that is connected to the particular LAN over a communication link.

26. The apparatus of claim 25, wherein the communication link is any one of a dial-up connection, a Wide Area Network (WAN) connection, a Digital Subscriber Line (DSL) connection, and an Integrated Services Digital Network (ISDN) connection.

27. A computer-readable storage medium storing one or more sequences of instructions for accessing information based on Distributed File System (DFS) paths, which instructions, when executed by one or more processors, cause the one or more processors to carry out the steps of:
a server intercepting a request to resolve a path to a file, wherein the request is sent from a client to a DFS root node;
wherein the DFS root node maintains a logical name space that includes a mapping between logical paths of network shares and physical location paths identifying network locations where the network shares are physically stored;
wherein, based on the mapping, the DFS root node is operable to resolve the logical paths of the network shares to the physical location paths;
the server sending, to the DFS root node, the request to resolve the path to the file;
the server receiving a response from the DFS root node, wherein the response includes one or more first DFS referrals, wherein each of the one or more first DFS referrals identifies a network entity and a directory exported by the network entity, wherein the file is stored in the directory;
in response to receiving the response from the DFS root node, the server adding a second DFS referral to the response, wherein the second DFS referral identifies a particular network entity and a particular directory exported by the particular network entity;

wherein each of the second DFS referral and the one or more first DFS referrals is a data structure that includes data identifying a physical location path to a separate copy of the same directory; and the server sending the response to the client;

wherein the response sent to the client includes the one or more first DFS referrals and the second DFS referral.

28. A computer-readable storage medium storing one or more sequences of instructions for accessing information based on Distributed File System (DFS) paths, which instructions, when executed by one or more processors, cause the one or more processors to carry out the steps of:

intercepting a request to resolve a path to a file, wherein the request is sent from a client to a DFS root node;

wherein the DFS root node maintains a logical name space that includes a mapping between logical paths of network shares and physical location paths identifying network locations where the network shares are physically stored;

wherein, based on the mapping, the DFS root node is operable to resolve the logical paths of the network shares to the physical location paths;

sending the request to the DFS root node;

receiving a response from the DFS root node, wherein the response includes a referral list that comprises one or more first DFS referrals, wherein each of the one or more first DFS referrals identifies a server and a directory exported by the server, wherein the file is stored in the directory;

in response to receiving the response from the DFS root node, creating a modified referral list by at least adding a second DFS referral to the referral list, wherein the second DFS referral identifies a particular server and a cache of the particular server;

wherein, in the modified referral list, each of the second DFS referral and the one or more first DFS referrals is a data structure that includes data identifying a physical location path to a separate copy of the same directory; and sending the response to the client, wherein the response includes the modified referral list, wherein the modified referral list includes the one or more first DFS referrals and the second DFS referral.

\* \* \* \* \*